May 31, 1949.　　　　A. E. CHURCH　　　　2,471,863

POWER ACTUATED WRENCH

Filed April 5, 1948

INVENTOR
A. E. CHURCH
BY Joseph K. Schofield
ATTORNEY

Patented May 31, 1949

2,471,863

UNITED STATES PATENT OFFICE 2,471,863

POWER ACTUATED WRENCH

Albert E. Church, New Britain, Conn., assignor to Union Manufacturing Company, New Britain, Conn., a corporation of Connecticut Application April 5, 1948, Serial No. 19,028

3 Claims. (Cl. 279—118)

This invention relates to work holding chucks for application generally to machine tool spindles and relates particularly to a detachable power operating means supported independently of the chuck spindle to open and close the jaws of the chuck, the power means being disconnected from the spindle and non-rotatable during operation of the machine tool.

A primary object of the invention is to provide a power operated device mounted and supported adjacent the tail end of the rotatable headstock spindle on which the work holding chuck is mounted and which may be quickly placed in driving relation with the chuck actuating member at the tail end of the spindle on which the chuck is mounted to open and close the chuck jaws.

Another object of importance of the invention is to provide within the rotating spindle on which the chuck is mounted a rotatable screw threaded member engageable as desired with the power actuated member, the screw threaded member when rotated in either direction by the actuator axially moving a splined member within the spindle and attached directly to the draw bar for the chuck to open or close the chuck jaws.

And finally it is an object of the invention to provide an improved form of connection between the chuck draw bar and the bell-cranks within the chuck body for moving the chuck jaws, the connection enabling the chuck and draw bar to be initially adjusted for any position of the master jaws of the chuck.

With the above and other objects in view the invention may include the features of construction and operation set forth in the following specification and illustrated in the accompanying drawing.

In the accompanying drawing annexed hereto and forming a part of this specification I have shown the invention embodied in a machine of the lathe type having a headstock within which a rotary work rotating spindle and chuck are mounted on a horizontal axis, but it will be understood that the invention can be otherwise embodied and that the drawing is not to be construed as defining or limiting the scope of the invention, the claims appended to this specification being relied upon for that purpose.

Figure 2:
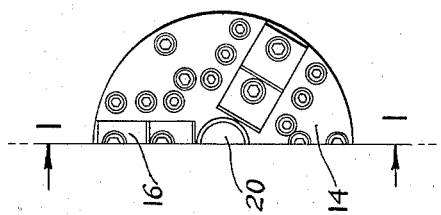
Fig. 2 is a partial front view of the chuck shown in Fig. 1 which may be used with the present invention.
Figure 3:
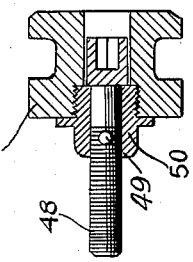
Fig. 3 is a sectional view of the adjustable connection between the chuck and its draw bars.
Figure 1:
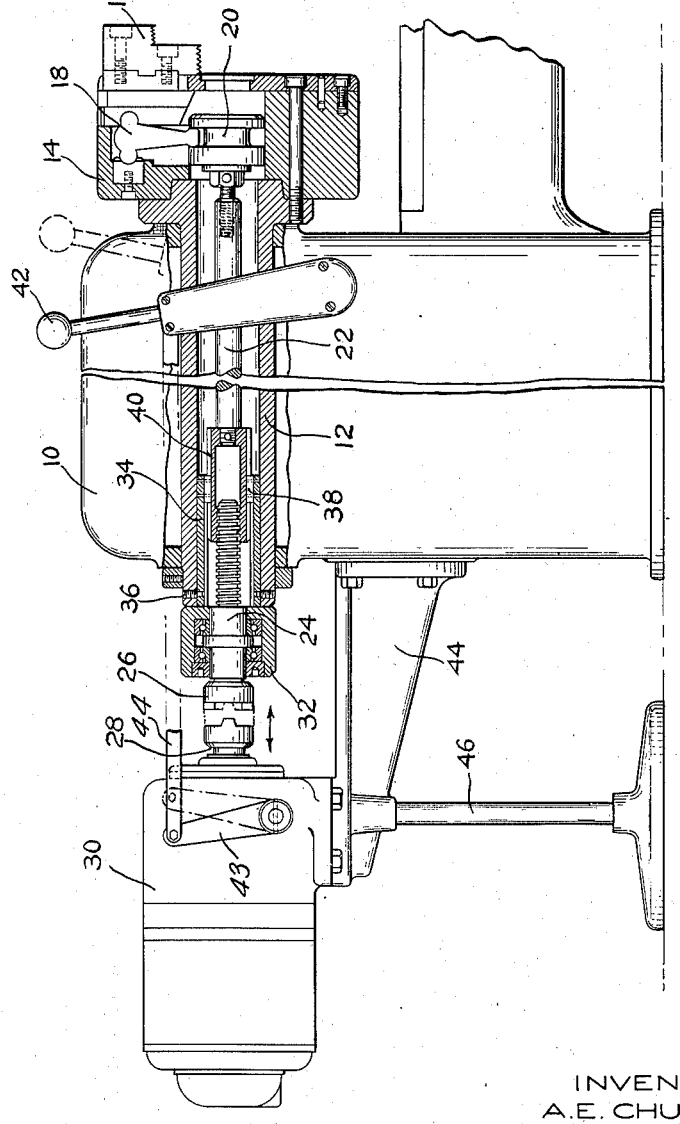
Fig. 1 is a front elevation, partly in section, of a machine tool having the present form of chuck jaw actuator applied thereto.

In the above mentioned drawing there has been shown but one embodiment of the invention which is now deemed preferable, but it is to be understood that changes and modifications may be made within the scope of the appended claims without departing from the spirit of the invention.

Briefly, and in its broadest aspect, the invention may include the following principal parts: First, a machine tool headstock having rotatably mounted therein a work supporting and rotating spindle; second, a chuck having radially movable work clamping jaws therein; third, bell-crank levers for actuating said jaws; fourth, a draw bar connected to said bell-cranks and extending centrally through the spindle; fifth, an internally threaded member fixed to the end of said draw bar and having a slidable engagement relative to the spindle for non-rotative axial movement within the spindle; sixth, an externally threaded rotatably mounted member within the spindle and maintained against axial movement, and seventh, a power rotated member movable into and out of driving connection with the outer end of the rotatable threaded member.

Referring more in detail to the figures of the drawing there is shown a machine having a headstock 10 within which is rotatably mounted on a fixed axis a work supporting and rotating spindle 12. At the head end of the spindle 12 is a chuck 14 having radially movable work clamping jaws 16. To actuate these jaws 16 bell-cranks 18 are pivotally mounted within the chuck 14, one arm of each being connected to a jaw 16 and the other and longer arm being connected to a member 20 axially movable centrally of the chuck 14. The outside diameter of this member 20 is peripherally grooved for receiving the inner ends of the bell-cranks 18.

Attached to the axially movable member 20 is a chuck draw bar 22 extending centrally through the spindle 12 and adjustably attached to the axially movable member 20 by means presently to be described.

At the tail end of the spindle 12 is a rotatably mounted threaded member 24 its outer end being provided with jaws 26 adapted to engage and be rotated by the shaft 28 of a motor driven actuator 30, the end of the shaft 28 having jaws inter-engaging the jaws 26 on the outer end of the threaded member 24. The threaded member 24 is mounted preferably on anti-friction bearings housed within a body member 32 engaging against the tail end of the spindle 12 and attached thereto by means not shown. Within this end of the spindle 12 is a sleeve member 34 retained in fixed position and maintained against rotation relative to the spindle 12 by retaining screws 36 but two of which are shown. The inner surface of this sleeve is provided with longitudinally extending keys 38 fixedly mounted within the sleeve 34 by suitable screws or pins. Slidable relative to these keys 38 and having longitudinally extending splines is an internally-threaded member 40 the internal threads of which engage the external threads of the rotatable threaded member 24. The inner end of the internally threaded and splined member 40 is secured in fixed position to the draw bar 22 as by being threaded and pinned thereto. Rotation of the threaded member 24 by the motor rotated shaft 28 in one or the other direction will force the splined member 40 axially relative to the spindle 12 and move the draw bar 22 in a direction to open or close the jaws 16 of the chuck 14.

The motor rotated shaft 28 as shown may be axially advanced to engage or disengage the outer end of the rotatable threaded member 24 by a hand lever 42 connected to a lever 43 on the motor actuator 30 by a reach arm 44. As the motor 30 and its rotatable shaft 28 are or may be of any standard form further description of them is not thought to be necessary. The shaft 28 may be drivingly connected to its motor through a speed reducing unit housed within the motor casing. The motor 30 and driving connections may be mounted with the shaft 28 in alignment with the rotatable threaded member 24 on a suitable bracket 44 fastened to a vertical surface of the headstock 10 and also supported by a pedestal 46.

To adjustably secure the draw bar 22 to the chuck jaw operating member 20 the chuck end of the draw bar 22 may be internally threaded and engaged by the threaded end of a recessed head screw 48 passing centrally through the spool member 20. To lock the parts in fixed adjusted position a nut 50 threaded into the spool member may be pinned to the bolt by a cross pin 49 after the desired adjustment has been effected.

The handle 42 for advancing the actuator 28 to engage the jaws 26 on threaded member 24 may be of the form shown and described in my pending application Ser. No. 792,105, filed December 16, 1947. The direction of rotation of the motor 30 to open or close the jaws 16 therefore may be controlled by the lever 42 after the jaws on motor shaft 28 have been brought into engagement with jaws 26 on rotatable member 24.

With the motor 30 and shaft 28 supported as shown by the bracket 44 and pedestal 46 no weight is added to the spindle 12 by this actuator for the chuck 14 and no inertia is added to the parts rotating with the spindle 12. During normal operation of the spindle 14 the actuator is disconnected from the spindle and is not rotated.

I claim as my invention:

1. A chuck actuating device comprising a spindle rotatably mounted within a headstock and having a chuck mounted on one end, a draw bar extending through said spindle and attached at one end to operating means for the jaws of said chuck, a splined member within said spindle secured to the opposite end of said draw bar, and power rotated means engaging said splined member, whereby rotation of said means axially moves said splined member and draw bar to open and close said jaws.

2. A chuck actuating device comprising a spindle rotatably mounted within a headstock and having a chuck mounted on one end, a draw bar extending through said spindle and attached at one end to operating means for the jaws of said chuck, a splined member slidably and non-rotatably mounted within said spindle, internal screw threads extending centrally within said splined member, a rotatable screw-threaded member mounted on the end of said spindle and engaging the screw threads on said splined member whereby rotation of said member relative to said spindle will axially move said splined member and draw bar to open and close said jaws and power rotated means detachably connectible to said rotatable threaded member, and power means attachable to said rotatable threaded member.

3. A chuck actuating device comprising a spindle rotatably mounted within a headstock and having a chuck at one end, a draw bar within said spindle for opening and closing the jaws of said chuck, an internally threaded member slidable within the spindle and maintained against rotation relative to the spindle, a rotatable threaded member engaging said slidable member and having its outer end provided with jaw teeth, a power actuator rotatable in either direction adjacent said rotatable member having jaw teeth on its outer end and movable into engagement with the jaws on said rotatable member, and unitary manual means to start rotation of said actuator in either direction and engage said actuator with said rotatable member to open and close said chuck jaws.

ALBERT E. CHURCH.

REFERENCES CITED

The following references are of record in the file of this patent:

UNITED STATES PATENTS

| Number | Name | Date |
|---|---|---|
| 1,081,183 | Wood | Dec. 9, 1913 |
| 1,831,225 | Bogart | Nov. 10, 1931 |
| 1,288,051 | Kylin | Dec. 17, 1918 |
| 2,363,721 | Evans | Nov. 28, 1944 |